United States Patent [19]
Roth et al.

[11] 3,834,797
[45] Sept. 10, 1974

[54] MOVIE CAMERA WITH SYNCHRON PULSE GENERATOR FOR A SOUND RECORDER

[75] Inventors: Johann Roth, Schwabhausen; Werner Grimm, Emmering, both of Germany

[73] Assignee: Braun Aktiengesellschaft, Frankfurt, Germany

[22] Filed: Apr. 9, 1973

[21] Appl. No.: 349,475

[30] Foreign Application Priority Data
Apr. 8, 1972 Germany............................ 2217036

[52] U.S. Cl. .................................................. 352/12
[51] Int. Cl. ............................................ G03b 31/00
[58] Field of Search .............. 352/12, 15, 16, 17, 22

[56] References Cited
UNITED STATES PATENTS
3,539,248   11/1970   Lancor............................. 352/17 X
3,675,994   7/1972   Badalich et al................... 352/17 X Primary Examiner—Samuel S. Matthews
Assistant Examiner—Michael L. Gellner
Attorney, Agent, or Firm—Ernest F. Marmorek

[57] ABSTRACT

A movie camera having a synchron pulse generator adapted for delivering synchron pulses for controlling the synchronized operation of an associated sound recording device during the running of the movie camera, a releaser for controlling the operation of the movie camera, a switch coupled to the releaser for effecting delivery and interruption of the signals from the synchron pulse generator, a sensing device controlling the switch and being responsive to the acceleration or numbers of revolutions of the film advancing mechanism.

13 Claims, 4 Drawing Figures

MOVIE CAMERA WITH SYNCHRON PULSE GENERATOR FOR A SOUND RECORDER

CROSS-REFERENCE TO OTHER APPLICATIONS

Application of Johann Roth, Ser. No. 297,016, filed Oct. 12, 1972 under the title "Method and Apparatus for Synchronous Recording of Sounds for a Film" and applications of Johann Roth filed on/or about Mar. 28, 1973 under Attorney's Docket 62–1140 and 62–1146, respectively.

FIELD OF THE INVENTION

The present invention relates to a movie camera having a synchron pulse generator provided therein for turning on a tape recording device during the running of the movie camera and, further being provided with a switch means for turning off the synchron pulses when the releaser of the movie camera is disengaged.

BACKGROUND OF THE INVENTION

It has been already known that when the releaser of the movie camera is disengaged or it is not pressed down anymore, then the tape recorder drive must be simultaneously stopped. This is disadvantageous in that the tape of a magnetic tape recording device is usually stopped during the run-out phase of a picture sequence while the film advancing mechanism usually keeps running a few more frames until the entire picture sequence has been compled. As a result the last frame which has been exposed during the picture sequence will not be always given a synchron pulse. Under the phrase picture sequence one should understand the advancing phase and the subsequently following exposure phase, or vice versa, of the film.

SUMMARY OF THE INVENTION

It is, therefore, an object of the present invention, to provide an improved movie camera in which the synchron pulses to the tape recorder are discontinued at the correct instant when the film advancing mechanism is turned off.

According to the present invention the switch means for turning off the synchron pulses is actuated by a sensing means which senses a change in the acceleration or numbers of revolution of a member of the film advancing mechanism. As a result, even for the last picture frames of the scene there will be given a synchron pulse.

The invention provides in one aspect thereof that the sensing means is a member capable of sensing the acceleration.

In another aspect of the present invention a speed sensing member is used as the sensing means.

According to the present invention in a first preferred embodiment thereof the sensing means comprises a camming disc which is mounted on a shaft coupled with the film advancing mechanism and which is provided with a coaxially mounted circularly shaped camming surface which at one portion thereof is provided by a recess or depression as the camming means, the sensing means furthermore includes a second camming disc similar to the first-mentioned camming disc and which is mounted on the same shaft and which is freely rotatable under a certain angle. Such angle of rotation of the second camming disc corresponds at least to the angle of aperture of the recess. According to the present invention the recess of the second camming disc when played and aligned with the recess of the first camming disc becomes flush therewith. A switch is provided according to the present invention having a switching lever which runs in contact with both of the camming surfaces of the two above-mentioned camming discs and is positioned in such a manner that the switching lever enters the recess of the fixedly mounted camming disc in its rest position. Inasmuch as the member of the film advancing mechanism carrying the above mentioned camming disc is delayed when a scene comes to end, the two recesses of the two camming discs become aligned in flush relationship with each other, during which and due to the positioning of the switching lever, the lever will enter into both recesses for the first time and only upon the completion of the first picture sequence and will operate the switch means to discontinue the synchronizing pulses.

The angular free rotation of the second camming disc, as above mentioned, is preferably limited by a pin means which is mounted axially parallel with the shaft carrying the discs and which projects into an arcuate recess in the first camming disc.

The freely rotatable camming disc, that is the second camming disc should be constructed to have a momentum of inertia which should be larger than the frictional momentum.

The shaft which carries the two camming discs preferably and according to the present invention should be provided by a boss or projection which, when the releaser of the camera is disengaged, will enter into the path of movement of a limit lever or arm coupled with the release of the camera. As a result, the switching or turning on mechanism of the film advancing mechanism becomes controlled by such limiting lever.

By employing a speed responsive sensing means it is preferably constructed as a governor or centrifugal member. According to a preferred form of the present invention such governor or centrifugal member is mounted on a shaft coupled with the film advancing mechanism.

BRIEF DESCRIPTION OF THE DRAWINGS

The present invention will become more readily apparent from the following description of preferred embodiments thereof shown in the accompanying drawing, in which.

DESCRIPTION OF THE PREFERRED EMBODIMENT

Figure 1:
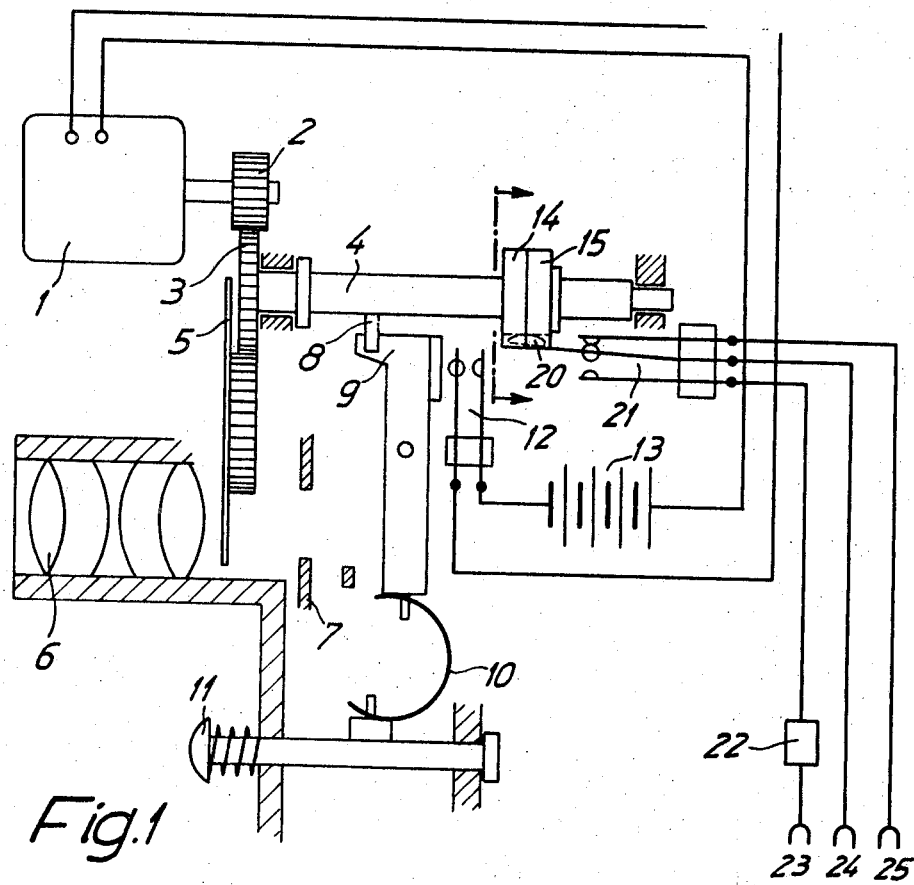
FIG. 1 illustrates schematically certain parts of a movie camera which are essential for the understanding of the present invention.

With reference to FIG. 1 illustrating the essential portions of a movie camera in a schematic fashion which are necessary to understand the present invention, one can see that the film advancing mechanism includes a motor 1 which by means of a pinion gear 2 is coupled with a toothed wheel 3 which is fixedly mounted on a shaft 4. With the toothed wheel 3 there is coupled also a sector-type disc 5 which interrupts the light rays between an objective and the film strip 7 during the advancing of the film.

On the shaft 4 there is provided fixedly a boss 8 which projects into the rest position of a limit lever 9 which by means of a leaf spring 10 is coupled with the releaser 11 on the movie camera. The limit lever 9 operates a motor switch 12 which is connected in series with a batter 13 and with the motor 1.

The shaft 4 carries furthermore a first camming disc 14 which is fixedly mounted thereto, and a second disc 15 mounted thereon in a fashion that it can be rotated over an angle freely. The construction and the arrangement of the two camming discs 14 and 15 can be seen and will be discussed in more detail with respect to FIG. 2.

Figure 2:
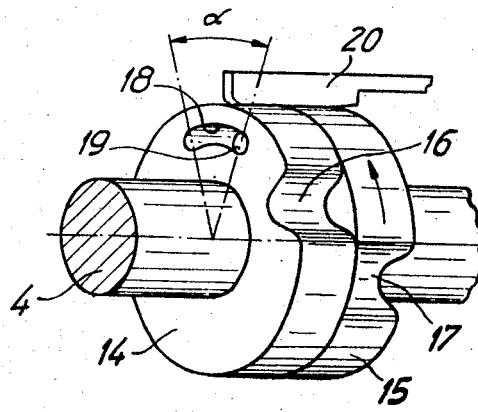
FIG. 2 is a perspective view of the two camming discs mounted on the shaft of the film advancing mechanism according to the present invention.

As can be seen in FIG. 2 the two discs 14 and 15 have a circularly shaped or cylindrical outer envelope surface and in which in each disc there is a recess 16, 17 provided, respectively. The first disc 14 is fixedly mounted on a shaft 4 and has formed therein an arcuate slot 18 into which a pin 19 projects, which in turn, is fixedly mounted to the front surface Of the disc 15. The pin 19 limits in cooperation with the arcuate slot 18 the freedom of rotation of the second disc 15. The recesses 16 and 17 are arranged on their respective discs in such a manner that the recesses 17, when the disc 15 is in its furthermost angular position of rotation where the pin 19 is at the opposite end of the slot 18 then shown in FIG. 2, the recesses 17 and 16 are aligned in a flush relationship with each other. In a rest position of the arrangement, under which one should understand the position when the releaser 11 of the movie camera is not actuated, a switch arm 20 of a switch means 21 will turn off the synchron process by assuming the contact position as can be seen in FIG. 1, since the switch arm 20 will sit within the axially aligned recesses 16 and 17. This position is defined as the rest position of the switch arm 20 and of the associated switching means 21, in which the synchron pulse generator 22 will be turned off. For this purpose the switch means 21 is constructed in the form of a make contact and is in series with the synchron pulse generator 22.

As it can be seen in FIGS. 1 and 2, the contacting end of the switch arm 20 runs on both envelope surfaces of the discs 14 and 15 and can go into its rest position only when it is simultaneously sitting in both recesses 16 and 17.

The arrangement illustrated in FIGS. 1 and 2 operates as follows:

In the rest position of the movie camera the contacting end of the switch lever 20 sits in both recesses 16 and 17. As soon as the camera release 11 is pressed down then the limit lever 9 becomes pivoted suddenly in the clockwise direction due to the action of the leaf spring 10 so that the boss 8 on the shaft 4 is given free while, at the same time, the motor switch 12 becomes closed by the lever 9. The motor 1 receives energizing current and will rotate and, at the same time, causes the rotation through pinion gear 2 of the toothed wheel 3 and, thereby, of the shaft 4. At the beginning of this movement the shaft 4 is accelerated so that the second disc 15 due to its momentum of inertia will lag behind with respect to the first disc 14 and will assume the position illustrated in FIG. 2 in which the recesses 16 and 17 are displaced with respect to each other. Thus at the beginning of the above described movement the contacting end of the switch lever 20 will run along the slanted side surfaces of the recesses 16 and 17 up onto the envelope surface of the disc 15 and 16, so that the switch 21 becomes closed and as a result, synchron pulses are delivered from the synchron pulse source 22 into the output terminals 23 and 24 going to the tape recorder. The lagging action of the freely moving disc 15 is defined in such a manner that the acceleration of shaft 4 will overcome the frictional force exerted by the bearing of the disc 15 on the shaft 4. Thus it can be understood from the above that during the running of the movie camera the switch lever 20 can not be run into the recesses 16 and 17 anymore, since during the rotation of the shaft 4 the recesses 16 and 17 are radially displaced with respect to each other due to the lagging of disc 15 and, as a result, the contacting end of the switch lever 20 will slide over the envelope surface of the discs 14 and 15. Consequently, during the running of the movie camera the switch 21 is closed and, as mentioned above, synchron pulses are delivered by the source 22 to the tape recorder.

As soon as the camera release 11 is released, the limit lever 9 will pivot, due to the action of the leaf spring 10, in a counterclockwise direction and into the path of the boss 8, so that the shaft 4 will be arrested in an angular position. When the boss 8 abutts against the lever 9, a stronger delay force is exerted onto the shaft 4, so that the freely moving disc 15 due to its sluggishness or momentum of inertia will run further to a position until the recess 17 in it will be aligned with the recess 16 of the first disc, and in which position the pin 19 will assume the opposite position in the arcuate slot 18 as it is shown in FIG. 2. In this position the contacting end of the switch lever 20 will sit in both recesses 16 and 17 so that the switch 21 becomes open as it is in FIG. 1 and, the synchron pulses become interrupted from the source 22 to the output terminals 23 and 24.

Figure 3:
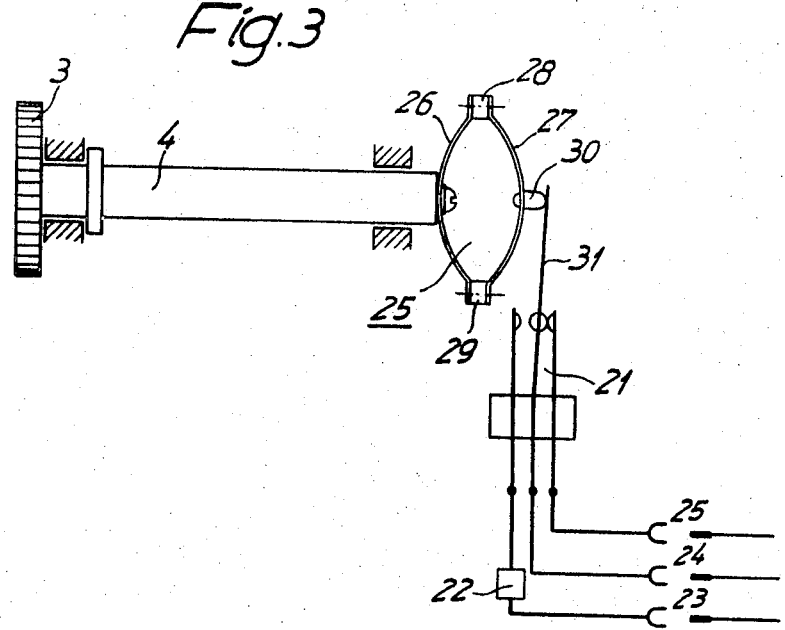
FIG. 3 illustrates a speed responsive sensing means according to the present invention as mounted on the shaft to the film advancing mechanism.

With reference to FIG. 3 it is noted that it illustrates another embodiment of the synchron operating of the present invention which provides for a sensing means responsive to the speed and, which is in the form of a centrifugal type switch 25. Such centrifugal switch 25 is mounted at the free end of the shaft 4 and includes a pair of arch-like springs 26, 27 at the outermost radial joining points at which weights 28 and 29 are mounted in the form of a governor, while in the center of the rotation the archlike spring 27 is provided with a switching pin 30 fixedly secured thereto which abutts against a switching tongue or arm 31 of the switch 21. It is noted that the remaining portions of the arrangement are similar to those illustrated in FIG. 1, and like reference numerals identify the same parts, while the parts not shown in FIG. 2 are the same as in FIG. 1.

The centrifugal-type switch 25 is adjusted in such a manner that even at a very low number of revolutions of the shaft 4, it will actuate the switch 21. Actuation of the switch 21 will cause the connection of the synchron pulse source 22 and delivery of the synchron pulses at output terminal 23, 24 to the tape recorder, as described above, in connection with FIG. 1. The position of the switch 21 in the illustration of FIG. 3 is in a disconnected position, that is similar as in FIG. 1.

Instead of the turning off and on of the synchron pulses, the switch 21 can be also employed to operate a quick stopping arrangement of a tape recorder device, such as, by actuating a magnet operating a stopping capstan. The switch 21 in the broad aspects of the present invention should satisfy such requirements.

Figure 4:
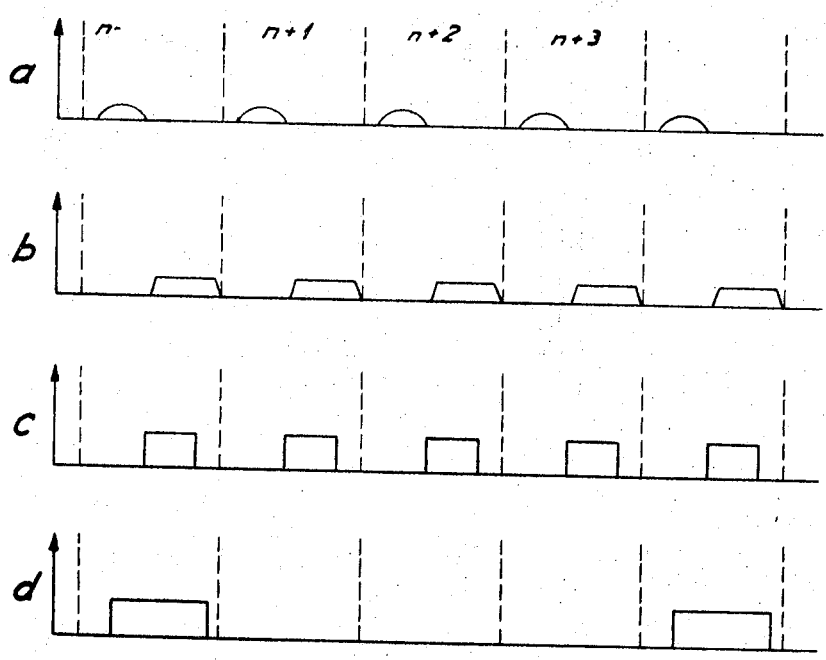
FIGS. 4a–4d are graphical representations of the operation of the synchorn devices according to the present invention.

FIG. 4 illustrates in a graphical representation the above described operation of the principles of the present invention.

In FIG. 4 a scene consisting of five picture sequences is illustrated. FIG. 4a illustrates, more particularly, the film advancing as a function of time. FIG. 4b illustrates the exposure as the function of the time. FIG. 4c illustrates the position of the synchron pulses which are delivered with each frame. FIG. 4d illustrates a synchron pulse generation process which is delivering pulses at each fourth frame.

When, for example, the releaser in known movie cameras would be released at position B, then the subsequently following third synchron pulse would not appear anymore in a position B till the camera is stopped.

With reference to the illustration of FIG. 4b according to which a synchron pulse is delivered only in each fourth frame of a scene, the synchronization would be made difficult in the case of known movie cameras, especially when the tape recorder is directly controlled, since in such case the magnetic tape would be turned off too early by about three picture frames and, as a result, the synchronized running of the magnetic tape and of the movie would become more and more disturbed from one scene to the other, since the distortions in the synchronization of each scene would be cumulative.

As it can be seen from the above description, the invention provides for the actuation of the switch 21 practically simultaneously with the stopping of the film advancing mechanism so that an extremely accurate synchronization with the tape recorder is attained.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A movie camera comprising a film advancing mechanism including a member, a synchron pulse generator adapted for delivering synchron pulses for controlling the synchronized operation of an associated sound recording device for recording the sound during the running of said film advancing mechanism, a releasing means controlling the operation of the movie camera, a switch means coupled to said releasing means and electrically connected to said pulse generator for effecting delivery and interruption of signals from said synchron pulse generator, a sensing means controlling said switch means and being responsive to a motional parameter of said member of said film advancing mechanism.

2. A movie camera as claimed in claim 1, wherein said sensing means comprises a member responsive to the acceleration of said member.

3. The movie camera as claimed in claim 1, wherein said sensing means comprises a member responsive to the speed of said member of said film advancing mechanism.

4. The movie camera as claimed in claim 1, wherein said sensing means comprises a disc means, said member of said film advancing mechanism comprises a shaft means coupled to said film advancing mechanism, said disc means being fixedly secured to said shaft means, said disc means having a coaxial outer envelope surface and having formed a recess in said surface at a predetermined angular position in said disc means, said sensing means further including a second disc means mounted on said shaft means and adapted to lag behind said first disc means by a predetermined angle during rotation of said shaft means, a recess formed in said outer surface of said second disc means at a predetermined angular position, said recess formed in said first disc means and the recess formed in said second disc means being aligned in a rest position of said shaft means, said switch means comprising a switch arm means mounted for sliding over said surface of said first and second disc means and adapted to enter said recesses of said disc means in the rest position of said disc means and causing actuation of said switch means to interrupt said synchron pulses from said synchron pulse generator, said switch arms means when sliding over said surfaces of said first and second disc means during the rotation of said shaft means during which said recesses are out of alignment, causing an actuation of said switch means for connecting said synchron pulse generator in circuit with said tape recorder.

5. The movie camera as claimed in claim 4, wherein means are provided on said first disc means and on said second disc means for cooperation to limit the angular lagging of said second disc means with respect to said first disc means and thereby defining an aligning of said first and second recesses in the rest position of said shaft means.

6. The movie camera as claimed in claim 5, wherein said limiting means comprises a pin means fixedly mounted on said second disc means and, a slot means formed in said first disc means and receiving said pin means in slidable engagement therein, the angular opening of said slot means defining said lagging for said second disc means behind said first disc means during acceleration of said shaft means.

7. The movie camera as claimed in claim 4, wherein said freely movable disc means has a momentum of inertia which is larger than the frictional momentum with respect to said shaft means.

8. The movie camera as claimed in claim 4, wherein a boss means is provided on said shaft means, a lever means coupled to said releasing means and cooperating with said boss means for arresting said shaft means in a rest position.

9. The movie camera as claimed in claim 8, wherein a further switch means is provided for the energization of said motor, said further switch means being connected in series with a source of potential and said motor, said lever means controlling said switch means when said releaser of the camera is actuated and thereby releasing said boss means for rotation with shaft means.

10. The movie camera as claimed in claim 1, wherein said sensing means is a centrifugal member for controlling operation of said switch means.

11. The movie camera as claimed in claim 10, wherein said centrifugal member is mounted on a rotating member of said film advancing mechanism.

12. The movie camera as claimed in claim 11, wherein said centrifugal member comprises a pair of flexible arms joined at their respective end portions, a fly weight carried at said end portions, whereby when said flexible members are rotated by said rotating member, the distance between said arms decreases, a switch actuating means carried by one of said arms at the median point thereof for opening and closing said switch means.

13. The movie camera as claimed in claim 10, wherein means are provided for adjusting said centrifugal member to respond to various speeds for actuation of said switch means.

* * * * *